(12) United States Patent
Kim (10) Patent No.: US 9,307,229 B2
(45) Date of Patent: Apr. 5, 2016

(54) STEREOSCOPIC IMAGE DISPLAY AND CROSSTALK COMPENSATION METHOD THEREOF

(75) Inventor: Kiltae Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 828 days.

(21) Appl. No.: 13/334,880

(22) Filed: Dec. 22, 2011

(65) Prior Publication Data

US 2012/0212577 A1 Aug. 23, 2012

(30) Foreign Application Priority Data

Feb. 18, 2011 (KR) .................. 10-2011-0014548

(51) Int. Cl.
*H04N 13/00* (2006.01)
*H04N 13/04* (2006.01)

(52) U.S. Cl.
CPC ....... *H04N 13/0497* (2013.01); *H04N 13/0438* (2013.01)

(58) Field of Classification Search
CPC ..................... H04N 13/0497; H04N 13/0438
USPC .......................................................... 348/43
See application file for complete search history.

(56) References Cited

U.S. PATENT DOCUMENTS

| | | | | | |
|---|---|---|---|---|---|
| 4,256,926 | A | * | 3/1981 | Pitroda et al. ................. | 379/269 |
| 5,025,312 | A | * | 6/1991 | Faroudja ....................... | 348/620 |
| 5,530,562 | A | * | 6/1996 | Eisenbarth et al. ........... | 358/496 |
| 5,821,989 | A | * | 10/1998 | Lazzaro et al. ................ | 348/56 |
| 6,002,518 | A | * | 12/1999 | Faris .............................. | 359/465 |
| 2004/0145560 | A1 | * | 7/2004 | Kim ............................... | 345/102 |
| 2004/0164934 | A1 | * | 8/2004 | Jeong .............................. | 345/63 |
| 2004/0238720 | A1 | * | 12/2004 | Loew et al. .................... | 250/206 |
| 2005/0057471 | A1 | * | 3/2005 | Lu et al. .......................... | 345/89 |
| 2007/0222726 | A1 | | 9/2007 | Chen et al. | |
| 2008/0238823 | A1 | * | 10/2008 | Choi ............................... | 345/60 |

(Continued)

FOREIGN PATENT DOCUMENTS

| | | |
|---|---|---|
| CN | 1479526 A | 3/2004 |
| CN | 101950542 A | 1/2011 |

(Continued)

OTHER PUBLICATIONS

Gu, "Thin Film Transistor Film (TFT)," pub. Apr. 2006, available at http://www.personal.kent.edu/~mgu/LCD/tft.htm.*

(Continued)

*Primary Examiner* — Gims Philippe
*Assistant Examiner* — Benjamin Pezzner
(74) *Attorney, Agent, or Firm* — Morgan, Lewis & Bockius LLP (57) ABSTRACT

A stereoscopic image display and a method for compensating for a crosstalk of the stereoscopic image display are disclosed. The stereoscopic image display includes a crosstalk compensation circuit and a display element. The crosstalk compensation circuit detects an input frame frequency, performs over driving control (ODC) modulation on 3D data to firstly compensate for a crosstalk of the 3D data, and multiplies the firstly compensated 3D data by a constant value, which is previously determined depending on the detected input frame frequency and is greater than zero and equal to or less than 1, to finally compensate for the crosstalk of the 3D data. The display element displays left eye image data and right eye image data included in the finally compensated 3D data in a time division manner.

7 Claims, 6 Drawing Sheets

(56) References Cited

U.S. PATENT DOCUMENTS

| | | | |
|---|---|---|---|
| 2010/0134512 A1* | 6/2010 | Kwon et al. | 345/589 |
| 2010/0309381 A1* | 12/2010 | Nakagawa et al. | 348/705 |
| 2011/0273439 A1 | 11/2011 | Son et al. | |
| 2011/0273463 A1 | 11/2011 | Lee et al. | |
| 2012/0075301 A1 | 3/2012 | Jang | |

FOREIGN PATENT DOCUMENTS

| | | |
|---|---|---|
| KR | 20100042969 | 4/2010 |
| KR | 20100042975 | 4/2010 |
| KR | 20100058945 | 6/2010 |
| KR | 20100099251 | 9/2010 |
| WO | 2010/143819 A | 5/2010 |

OTHER PUBLICATIONS

Nave, "Storing Energy in a Capacitor," pub. Dec. 2005, available at http://hyperphysics.phy-astr.gsu.edu/hbase/electric/capeng2.html.*

Chinese Office Action dated Jan. 6, 2014 for corresponding Patent Application No. 201110424168.1.

Office Action dated Jul. 31, 2015 from the German Patent and Trademark Office in German counterpart application with file reference 102011088627.3.

* cited by examiner

FIG. 1

(RELATED ART)

STEREOSCOPIC IMAGE DISPLAY AND CROSSTALK COMPENSATION METHOD THEREOF

This application claims the benefit of Korean Patent Application No. 10-2011-0014548 filed on Feb. 18, 2011, which is incorporated herein by reference for all purposes as if fully set forth herein.

BACKGROUND OF THE INVENTION

1. Field of the Invention

Embodiments of the invention relate to a stereoscopic image display and a method for compensating for a crosstalk of the stereoscopic image display capable of improving picture quality.

2. Discussion of the Related Art

With the advancement of various image processing techniques, stereoscopic image displays capable of implementing a three-dimensional stereoscopic image (hereinafter referred to as '3D image') have been recently developed.

The stereoscopic image displays implement the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

The glasses type method is roughly classified into a first polarizing filter method using a patterned retarder film and polarized glasses, a second polarizing filter method using a switching liquid crystal layer and polarized glasses, and an LC shutter glasses method. In the first and second polarizing filter methods, a transmittance of the 3D image is low because of the patterned retarder film and the switching liquid crystal layer, each of which is disposed on the display panel to serve as a polarizing filter.

In the LC shutter glasses method, a left eye image and a right eye image are alternately displayed on the display panel every one frame, and a left eye shutter and a right eye shutter of LC shutter glasses are opened and closed in synchronization with display timing of the display panel, thereby implementing the 3D image. The LC shutter glasses open only the left eye shutter during nth frame periods, in which the left eye image is displayed, and open only the right eye shutter during (n+1)th frame periods, in which the right eye image is displayed, where n is a natural number, thereby making binocular disparity in a time division manner.

The stereoscopic image display generally uses a liquid crystal display (LCD) as a display element implementing an image. Response characteristic of the hold type display element, the LCD is slightly delayed depending on data entry. An image trailing phenomenon is generated because of the delay of the response characteristic of liquid crystals at a time when the left eye image is converted into the right eye image or at a time when the right eye image is converted into the left eye image. Hence, 3D crosstalk of ghost form appears.

An over driving control (ODC) modulation method is known to improve the response characteristic of the liquid crystals. The ODC modulation method compares previous frame data with current frame data, decides changes of data based on the comparison result, and modulates input data to a compensation value corresponding to the decision result. When a gray level of the current frame data is greater than a gray level of the previous frame data, the ODC modulation method modulates the current frame data to a value greater than an input gray level. On the contrary, when the gray level of the current frame data is less than the gray level of the previous frame data, the ODC modulation method modulates the current frame data to a value less than the input gray level. As a result, the response characteristic of the liquid crystals is improved.

However, in the ODC modulation method, when the current frame data of the same gray level is represented, a luminance deviation is generated depending on what the gray level of the previous frame data is. Thus, when the existing ODC modulation method is applied to the stereoscopic image display, it is difficult to reduce the 3D crosstalk because of the luminance deviation.

A technology has been recently proposed to remove the problem of the luminance deviation while applying the ODC modulation method to the stereoscopic image display and to reduce the 3D crosstalk. However, the technology was designed based on a national television standards committee (NTSC) format having an input frame frequency of 60 Hz. Therefore, when the technology is applied to a phase alternate line (PAL) format having an input frame frequency of 50 Hz, the problems illustrated in FIG. 1 may be generated.

Figure 1:
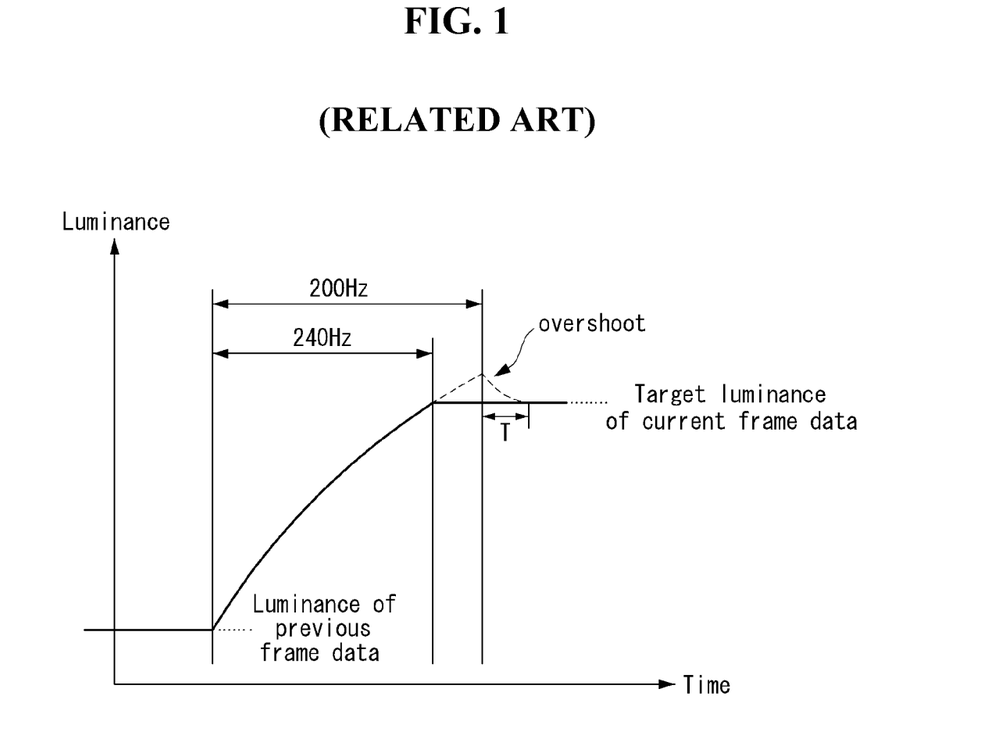
FIG. 1 illustrates an example where a response of liquid crystals is delayed depending on an input frame frequency.

In other words, as shown in FIG. 1, when the crosstalk reduction technology designed based on the NTSC format is equally applied to the stereoscopic image display using the PAL format irrespective of the input frame frequency, a liquid crystal response is achieved within a desired time to reach a target luminance of the current frame data from a luminance of the previous frame data at about 240 Hz (based on the NTSC format). On the other hand, because the time it takes to reach the target luminance of the current frame data is delayed from the desired time by a predetermined value T due to the over shoot at about 200 Hz (based on the PAL format), the 3D crosstalk is generated.

A profile of the liquid crystals varies depending on the input frame frequency. Thus, an additional complement capable of solving the problems of the crosstalk reduction technology in consideration of the input frame frequency is required.

SUMMARY OF THE INVENTION

Embodiments of the invention provide a stereoscopic image display and a method for compensating for a crosstalk of the stereoscopic image display capable of preventing a 3D crosstalk irrespective of an input frame frequency.

In one aspect, there is a stereoscopic image display comprising a crosstalk compensation circuit configured to detect an input frame frequency, perform over driving control (ODC) modulation on 3D data to firstly compensate for a crosstalk of the 3D data, and multiply the firstly compensated 3D data by a predetermined constant value, which is previously determined depending on the detected input frame frequency and is greater than zero and equal to or less than 1, to finally compensate for the crosstalk of the 3D data, and a display element configured to display left eye image data and right eye image data included in the finally compensated 3D data in a time division manner.

The crosstalk compensation circuit includes an input frequency detecting unit configured to detect the input frame frequency based on a vertical sync signal, a first crosstalk compensation unit configured to perform the over driving control (ODC) modulation on the 3D data input via the input frequency detecting unit to firstly compensate for the crosstalk of the 3D data, and a second crosstalk compensation unit configured to multiply the firstly compensated 3D data by the predetermined constant value to finally compensate for the crosstalk of the 3D data.

The input frequency detecting unit includes a national television standards committee (NTSC)/phase alternate line (PAL) deciding unit configured to divide the vertical sync signal by 60 Hz, output a first decision signal based on the decision of NTSC format when a remainder after the division is zero, and output a second decision signal based on the decision of PAL format when the remainder after the division is not zero, an NTSC signal detecting unit configured to detect whether the vertical sync signal is 120 Hz or 240 Hz in response to the first decision signal, and a PAL signal detecting unit configured to detect whether the vertical sync signal is 100 Hz or 200 Hz in response to the second decision signal.

When the vertical sync signal is 240 Hz, the NTSC signal detecting unit stores a binary number '00' indicating an NTSC signal of 240 Hz in an electrically erasable programmable read-only memory (EEPROM) as a frame frequency information. Further, when the vertical sync signal is 120 Hz, the NTSC signal detecting unit stores a binary number '10' indicating the NTSC signal of 120 Hz in the EEPROM as the frame frequency information.

When the vertical sync signal is 200 Hz, the PAL signal detecting unit stores a binary number '01' indicating a PAL signal of 200 Hz in the EEPROM as the frame frequency information. Further, wherein when the vertical sync signal is 100 Hz, the PAL signal detecting unit stores a binary number '11' indicating the PAL signal of 100 Hz in the EEPROM as the frame frequency information.

When the frame frequency information stored in the EEPROM is the binary number '00', the second crosstalk compensation unit multiplies the firstly compensated 3D data by a first constant value equal to 1. When the frame frequency information stored in the EEPROM is the binary number '01', the second crosstalk compensation unit multiplies the firstly compensated 3D data by a second constant value less than the first constant value. When the frame frequency information stored in the EEPROM is the binary number '10', the second crosstalk compensation unit multiplies the firstly compensated 3D data by a third constant value less than the second constant value. When the frame frequency information stored in the EEPROM is the binary number '11', the second crosstalk compensation unit multiplies the firstly compensated 3D data by a fourth constant value less than the third constant value.

As the input frame frequency gradually decreases from a reference frame frequency obtained by multiplying the input frame frequency by the constant value of 1, the second crosstalk compensation unit multiplies the firstly compensated 3D data by the gradually decreasing constant value between zero and 1.

The reference frame frequency is the highest frequency selected among previously determined frame frequencies.

The stereoscopic image display further comprises liquid crystal shutter glasses configured to alternately open and close a left eye shutter and a right eye shutter of the liquid crystal shutter glasses in synchronization with the display element.

The stereoscopic image display further comprises an active retarder attached on the display panel, the active retarder converting polarization characteristic of the left eye image and polarization characteristic of the right eye image differently from each other, and polarized glasses including a left eyeglass transmitting only first polarized light and a right eyeglass transmitting only second polarized light having an optical axis perpendicular to an optical axis of the first polarized light.

In another aspect, there is a method for compensating for a crosstalk of a stereoscopic image display comprising detecting an input frame frequency based on a vertical sync signal, performing over driving control (ODC) modulation on 3D data to firstly compensate for a crosstalk of the 3D data, and multiplying the firstly compensated 3D data by a predetermined constant value, which is previously determined depending on the detected input frame frequency and is greater than zero and equal to or less than 1, to finally compensate for the crosstalk of the 3D data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described with reference to FIGS. 2 to 7.

Figure 2:
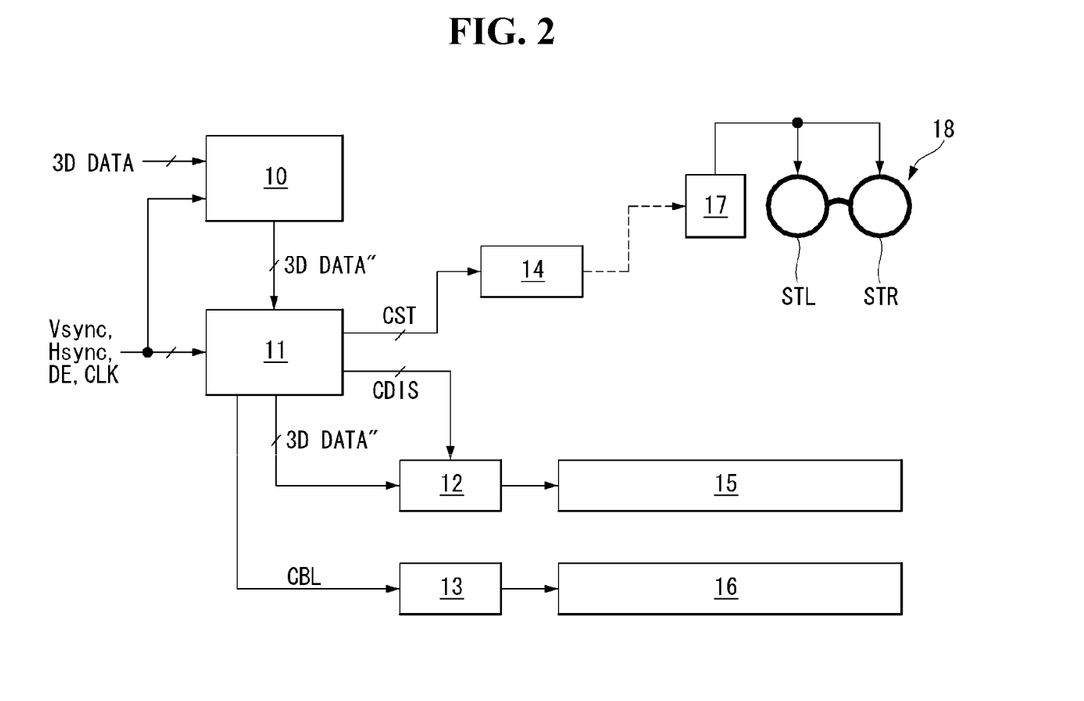
FIG. 2 illustrates a stereoscopic image display according to an exemplary embodiment of the invention.

FIG. 2 illustrates a stereoscopic image display according to an exemplary embodiment of the invention.

As shown in FIG. 2, the stereoscopic image display according to the embodiment of the invention includes a display panel 15, a display panel driving circuit 12, a backlight unit 16, a backlight driving circuit 13, liquid crystal (LC) shutter glasses 18, a shutter control signal transmission unit 14, a shutter control signal reception unit 17, a crosstalk compensation circuit 10, and a control circuit 11. The display panel driving circuit 12, the backlight driving circuit 13, the display panel 15, and the backlight unit 16 constitute a display element.

The display panel 15 alternately displays left eye image data and right eye image data every predetermined periods of time under the time division control of the control circuit 11. A black data frame, in which a black image is displayed, may be inserted between each of left eye data frames, in which a left eye image is displayed, and each of right eye data frames, in which a right eye image is displayed. The display panel 15 may be implemented as a transmissive liquid crystal display (LCD) panel which modulates light from the backlight unit 16 based on a data voltage applied to a liquid crystal layer.

The transmissive LCD panel includes a thin film transistor (TFT) substrate (or a lower glass substrate) and a color filter substrate (or an upper glass substrate). A liquid crystal layer is formed between the TFT substrate and the color filter substrate. Data lines and gate lines (or scan lines) are formed on the TFT substrate to cross each other. Further, liquid crystal cells are disposed in a matrix form in pixel areas defined by crossings of the data lines and the gate lines of the TFT substrate. A TFT formed at each of the crossings of the data lines and the gate lines transfers the data voltage supplied by way of the data line to a pixel electrode of the liquid crystal cell in response to a scan pulse from the gate line. To this end, a gate electrode of the TFT is connected to the gate line, a source electrode of the TFT is connected to the data line, and a drain electrode of the TFT is connected to the pixel electrode of the liquid crystal cell.

A common voltage is applied to a common electrode opposite to the pixel electrode. The color filter substrate includes black matrixes and color filters. In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate along with the pixel electrodes. Polarizing plates are respectively attached to the upper glass substrate and the lower glass substrate of the transmissive LCD panel. Alignment layers for setting a pre-tilt angle of liquid crystals are respectively formed on the upper glass substrate and the lower glass substrate of the transmissive LCD panel. A spacer is formed between the upper and lower glass substrates of the transmissive LCD panel to keep a cell gap of the liquid crystal layer constant. The transmissive LCD panel may be implemented in any liquid crystal mode as well as the TN, VA, IPS, and FFS modes.

The display panel driving circuit 12 includes a data driving circuit and a gate driving circuit. The data driving circuit converts finally compensated 3D data 3D DATA" received from the control circuit 11 into positive and negative gamma compensation voltages to generate positive and negative analog data voltages. The positive/negative analog data voltages output from the data driving circuit are supplied to the data lines of the display panel 15. The gate driving circuit sequentially supplies gate pulses (or scan pulses) synchronized with the data voltages to the gate lines of the display panel 15.

The backlight unit 16 is turned on during a predetermined time period to irradiate light onto the display panel 15, and is turned off during other time periods. The backlight unit 16 is repeatedly turned on and off periodically. The backlight unit 16 includes light source, which is turned on depending to driving power supplied from the backlight driving circuit 13, a light guide plate (or a diffusion plate), a plurality of optical sheets, and the like. The backlight unit 16 may be implemented as a direct type backlight unit or an edge type backlight unit. The light source of the backlight unit may include one or at least two of a hot cathode fluorescent lamp (HCFL), a cold cathode fluorescent lamp (CCFL), an external electrode fluorescent lamp (EEFL), and a light emitting diode (LED).

The backlight driving circuit 13 generates the driving power to turn on the light source. The backlight driving circuit 13 supplies the driving power to the light source under the control of the control circuit 11.

The LC shutter glasses 18 include a left eye shutter STL and a right eye shutter STR which are separately controlled electrically. Each of the left eye shutter STL and the right eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode, each of the left and right eye shutters STL and STR transmits light from the display panel 15 in response to a shutter control signal CST. On the other hand, when the OFF voltage is supplied to the second transparent electrode, each of the left and right eye shutters STL and STR blocks the light from the display panel 15 in response to the shutter control signal CST.

The shutter control signal transmission unit 14 is connected to the control circuit 11 and transmits the shutter control signal CST received from the control circuit 11 to the shutter control signal reception unit 17 via a wired/wireless interface. The shutter control signal reception unit 17 is installed in the LC shutter glasses 18 and receives the shutter control signal CST via the wired/wireless interface. The shutter control signal reception unit 17 alternately opens and closes the left eye shutter STL and the right eye shutter STR of the LC shutter glasses 18 in response to the shutter control signal CST. When the shutter control signal CST of a first logic value is input to the shutter control signal reception unit 17, the ON voltage is supplied to the second transparent electrode of the left eye shutter STL and the OFF voltage is supplied to the second transparent electrode of the right eye shutter STR. When the shutter control signal CST of a second logic value is input to the shutter control signal reception unit 17, the OFF voltage is supplied to the second transparent electrode of the left eye shutter STL and the ON voltage is supplied to the second transparent electrode of the right eye shutter STR. Accordingly, the left eye shutter STL of the LC shutter glasses 18 is opened when the shutter control signal CST of the first logic value is generated (i.e., when the left eye image is displayed). The right eye shutter STR of the LC shutter glasses 18 is opened when the shutter control signal CST of the second logic value is generated (i.e., when the right eye image is displayed).

The crosstalk compensation circuit 10 detects an input frame frequency and performs over driving control (ODC) modulation on 3D data, thereby firstly compensating for a crosstalk of the 3D data. Then, the crosstalk compensation circuit 10 multiplies the firstly compensated 3D data by a predetermined constant value, which is previously determined depending on the detected input frame frequency and is greater than zero and equal to or less than 1, thereby finally compensating for the crosstalk of the 3D data. The crosstalk compensation circuit 10 supplies the finally compensated 3D data 3D DATA" to the control circuit 11. The crosstalk compensation circuit 10 is described in detail below with reference to FIGS. 3 to 5.

The control circuit 11 receives timing signals including a vertical sync signal Vsync, a horizontal sync signal Hsync, a data enable DE, a dot clock CLK, etc. from a system circuit (not shown). The control circuit 11 produces a display panel control signal CDIS, a backlight control signal CBL, and the shutter control signal CST based on the timing signals.

The display panel control signal CDIS includes a data control signal DDC for controlling operation timing of the data driving circuit and a gate control signal GDC for controlling operation timing of the gate driving circuit. The data control signal DDC includes a source start pulse SSP, a source sampling clock SSC, a polarity control signal POL, a source output enable SOE, and the like. The source start pulse SSP controls a data sampling start time point of the data driving circuit. The source sampling clock SSC controls a sampling operation of the data driving circuit based on its rising or falling edge. If digital video data to be input to the data driving circuit is transferred based on a mini low voltage differential signaling (LVDS) interface standard, the source start pulse SSP and the source sampling clock SSC may be omitted. The polarity control signal POL inverts a polarity of the data voltage output from the data driving circuit every K horizontal periods, where K is a positive integer. The source output enable SOE controls output timing of the data driving circuit. The gate control signal GDC includes a gate start pulse GSP, a gate shift clock GSC, a gate output enable GOE, and the like. The gate start pulse GSP controls output timing of a first gate pulse. The gate shift clock GSC shifts the gate start pulse GSP. The gate output enable GOE controls output timing of the gate driving circuit.

The backlight control signal CBL includes a turn-on duty control signal for controlling a turn-on duty ratio of the light source and a turn-on sync control signal for controlling a turn-on period of the light source. The backlight control signal CBL is supplied to the backlight driving circuit 13 and controls the operation of the backlight driving circuit 13. The shutter control signal CST is transmitted to the shutter control signal reception unit 17 via the shutter control signal transmission unit 14 and controls the open and close timings of the left eye shutter STL and the right eye shutter STR of the LC shutter glasses 18.

The control circuit 11 supplies the finally compensated 3D data 3D DATA" received from the crosstalk compensation circuit 10 to the display panel driving circuit 12.

Figure 3:
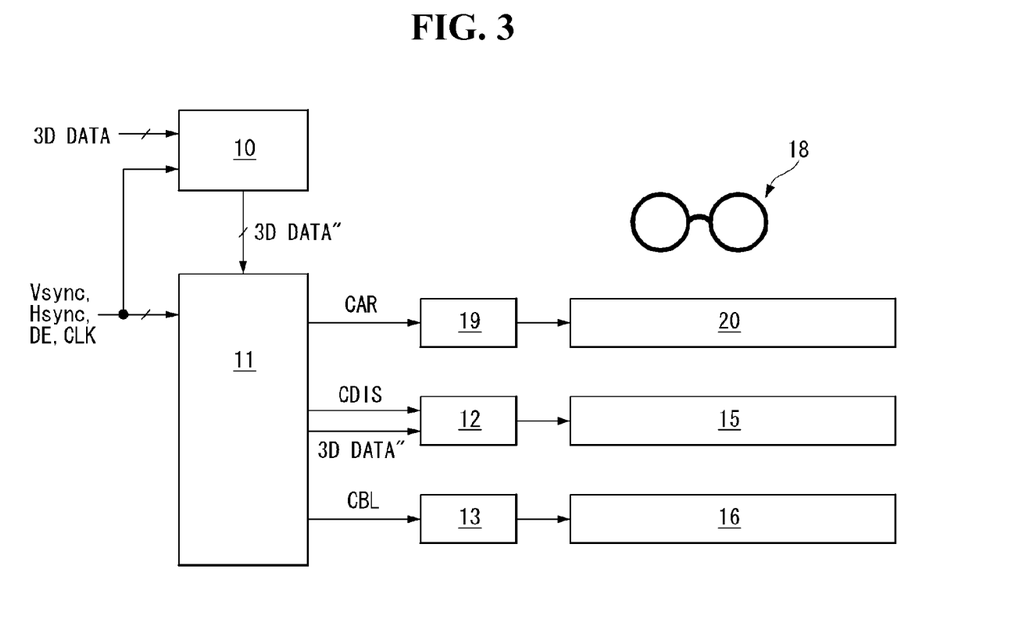
FIG. 3 illustrates a stereoscopic image display according to another exemplary embodiment of the invention.

FIG. 3 illustrates a stereoscopic image display according to another exemplary embodiment of the invention.

As shown in FIG. 3, the stereoscopic image display according to the embodiment of the invention includes a display panel 15, a display panel driving circuit 12, a backlight unit 16, a backlight driving circuit 13, an active retarder 20, an active retarder driving circuit 19, polarized glasses 30, a crosstalk compensation circuit 10, and a control circuit 11.

Since the display panel 15, the display panel driving circuit 12, the backlight unit 16, the backlight driving circuit 13, and the crosstalk compensation circuit 10 are substantially the same as those illustrated in FIG. 2, a further description may be briefly made or may be entirely omitted. In the stereoscopic image display illustrated in FIG. 3, the control circuit 11 produces an active retarder control signal CAR instead of the shutter control signal.

The active retarder 20 is attached on the display panel 15 and converts polarization characteristic of a left eye image and polarization characteristic of a right eye image differently from each other. The active retarder 20 includes a liquid crystal layer, electrodes for applying an electric field to the liquid crystal layer, and a quarter wavelength plate formed on the liquid crystal layer. The active retarder 20 electrically controls birefringent properties of the liquid crystal layer, thereby converting polarization characteristic of light incident from the display panel 15. The liquid crystal layer of the active retarder 20 serves as a half wavelength retardation layer, which transmits incident light without retarding a phase of the incident light when an ON-voltage is applied to the liquid crystal layer, and retards the phase of the incident light by half wavelength when an OFF-voltage is applied to the liquid crystal layer. During frame periods in which the left eye image is displayed, the liquid crystal layer retards a phase of −45° linearly polarized light passing through an upper polarizing plate of the display panel 15 by half wavelength in response to the OFF-voltage, thereby converting the −45° linearly polarized light into 45° linearly polarized light. Then, the quarter wavelength plate retards a phase of the 45° linearly polarized light passing through the liquid crystal layer by quarter wavelength, thereby converting it into left circularly polarized light. During frame periods in which the right eye image is displayed, the liquid crystal layer transmits −45° linearly polarized light passing through the upper polarizing plate of the display panel 15 in response to the ON-voltage without retarding its phase. Then, the quarter wavelength plate retards a phase of the −45° linearly polarized light passing through the liquid crystal layer by quarter wavelength, thereby converting it into right circularly polarized light.

The active retarder driving circuit 19 supplies the ON-voltage and the OFF-voltage to the active retarder 20 in response to the active retarder control signal CAR.

The polarized glasses 30 includes a left eyeglass having a left circular polarizing filter and a right eyeglass having a right circular polarizing filter. The left circular polarizing filter transmits only left circularly polarized light incident from the active retarder 20, and the right circular polarizing filter transmits only right circularly polarized light incident from the active retarder 20.

Figure 4:
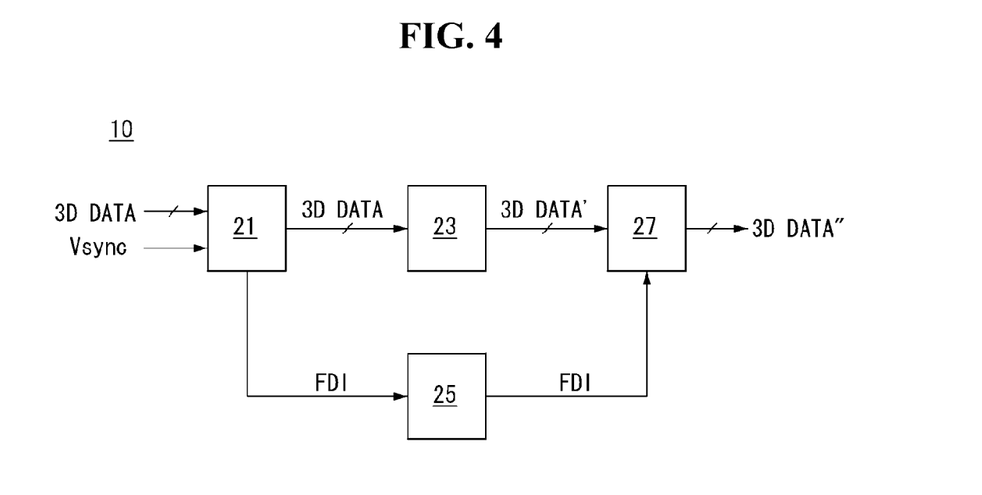
FIG. 4 illustrates a crosstalk compensation circuit.
Figure 5:
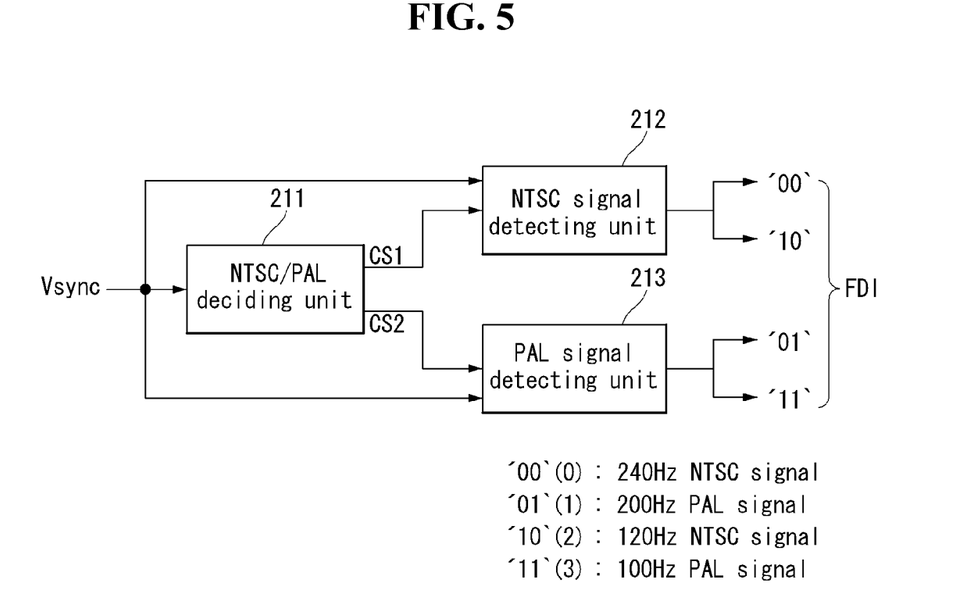
FIG. 5 illustrates an input frequency detecting unit.
Figure 6:
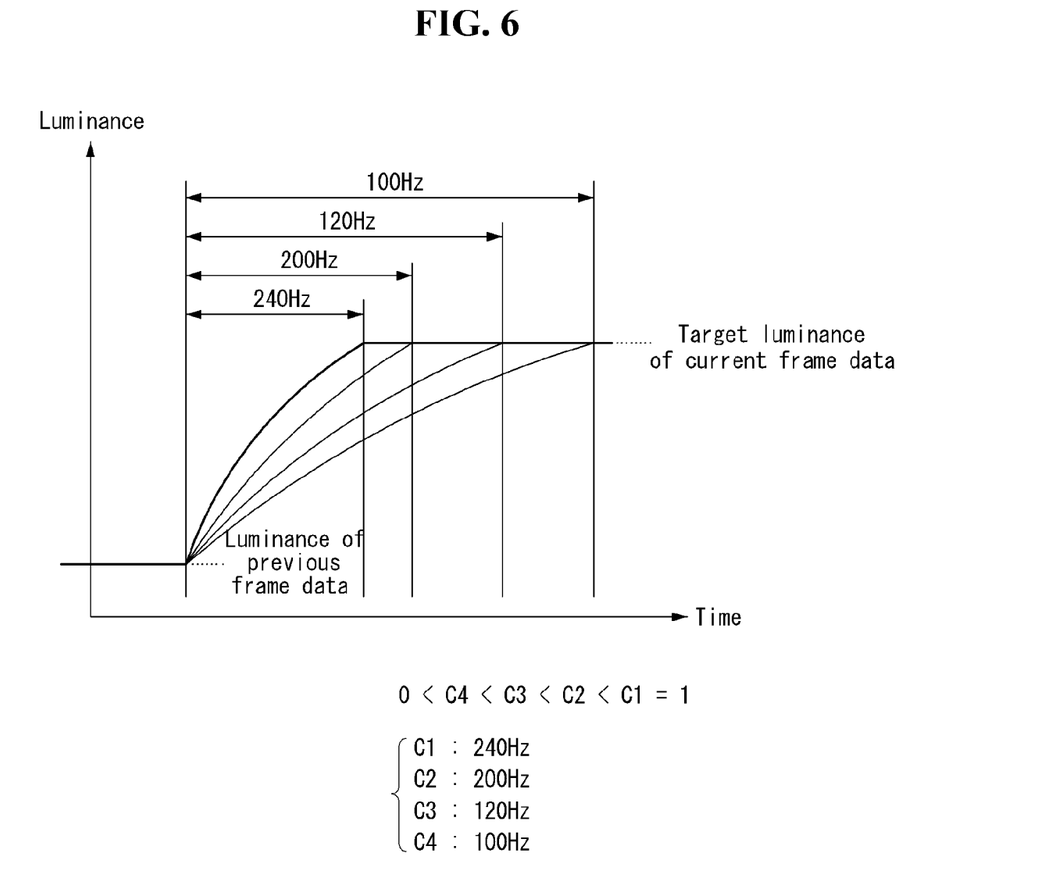
FIG. 6 illustrates a response of liquid crystals by finally compensated 3D data.

FIG. 4 illustrates a detailed configuration of the crosstalk compensation circuit 10 shown in FIGS. 2 and 3. FIG. 5 illustrates in detail an input frequency detecting unit shown in FIG. 4. FIG. 6 illustrates a response of liquid crystals by the finally compensated 3D data 3D DATA".

As shown in FIG. 4, the crosstalk compensation circuit 10 includes an input frequency detecting unit 21, a first crosstalk compensation unit 23, an electrically erasable programmable read-only memory (EEPROM) 25, and a second crosstalk compensation unit 27.

The input frequency detecting unit 21 detects an input frame frequency based on the vertical sync signal Vsync and stores information FDI of the input frame frequency in the EEPROM 25. For this, as shown in FIG. 5, the input frequency detecting unit 21 includes an NTSC/PAL (national television standards committee/phase alternate line) deciding unit 211, an NTSC signal detecting unit 212, and a PAL signal detecting unit 213.

The NTSC/PAL deciding unit 211 divides the vertical sync signal Vsync by 60 Hz. When a remainder after the division is zero, the NTSC/PAL deciding unit 211 outputs a first decision signal CS1 based on the decision of NTSC format. When the remainder after the division is not zero, the NTSC/PAL deciding unit 211 outputs a second decision signal CS2 based on the decision of PAL format.

The NTSC signal detecting unit 212 operates in response to the first decision signal CS1 and detects whether the vertical sync signal Vsync is 120 Hz or 240 Hz. When the vertical sync signal Vsync is 240 Hz, the NTSC signal detecting unit 212 stores a binary number '00' (i.e., decimal number '0') indicating the NTSC signal of 240 Hz in the EEPROM 25 as the frame frequency information FDI. When the vertical sync signal Vsync is 120 Hz, the NTSC signal detecting unit 212 stores a binary number '10' (i.e., decimal number '2') indicating the NTSC signal of 120 Hz in the EEPROM 25 as the frame frequency information FDI.

The PAL signal detecting unit 213 operates in response to the second decision signal CS2 and detects whether the vertical sync signal Vsync is 100 Hz or 200 Hz. When the vertical sync signal Vsync is 200 Hz, the PAL signal detecting unit 213 stores a binary number '01' (i.e., decimal number '1') indicating the PAL signal of 200 Hz in the EEPROM 25 as the frame frequency information FDI. When the vertical sync signal Vsync is 100 Hz, the PAL signal detecting unit 213 stores a binary number '11' (i.e., decimal number '3') indicating the PAL signal of 100 Hz in the EEPROM 25 as the frame frequency information FDI.

The first crosstalk compensation unit 23 performs the ODC modulation on the 3D data input via the input frequency detecting unit 21, thereby firstly compensating for the crosstalk of the 3D data. The first crosstalk compensation unit 23 inserts a black data frame B between each of left eye data frames, in which the left eye image is displayed, and each of right eye data frames, in which the right eye image is displayed. This data display manner is called 'L(Left Frame)B (Black Frame)R(Right Frame)B(Black Frame)' data display manner. Related art technologies proposed by the present applicant may be used to solve the problem of luminance deviation in the LBRB data display manner for preventing an image trailing phenomenon.

In other words, the first crosstalk compensation unit 23 reflects a gray level information of the left eye data frame L (or the right eye data frame R) just before each black data frame B on each black data frame B through various operations, as disclosed in 10-2010-0042969 corresponding to the present applicant, and which are hereby incorporated by reference in their entirety. Then, if a current frame is the left/right eye data frame L/R, the first crosstalk compensation unit 23 may select a region #1 from a lookup table and perform the ODC modulation on data to be displayed in the left/right eye data frame L/R using compensation values registered in the region #1. On the other hand, if the current frame is the black data frame B, the first crosstalk compensation unit 23 may select a region #2 from the lookup table and modulate data to be displayed in the black data frame B as black data using compensation values registered in the region #2.

Alternatively, the first crosstalk compensation unit 23 may modulate data of the current frame based on data before two frames, as disclosed in 10-2010-0042975 corresponding to the present applicant, and which are hereby incorporated by reference in their entirety. Namely, the first crosstalk compensation unit 23 may perform the ODC modulation on data to be displayed in the right eye data frame R (or the left eye data frame L) based on the left eye data frame L (or the right eye data frame R).

Alternatively, the first crosstalk compensation unit 23 may double the left eye data frame L and the right eye data frame R and perform the ODC modulation on the doubled data frames (i.e., LLRR), as disclosed in 10-2010-0099251 corresponding to the present applicant, and which are hereby incorporated by reference in their entirety. Then, the first crosstalk compensation unit 23 may insert the black data frame B at a corresponding location.

Further, the first crosstalk compensation unit 23 alternatively arranges two left eye data frames, in which the left eye image is displayed, and two right eye data frames, in which the right eye image is displayed. This data display manner is called 'L(Left Frame)L(Left Frame)R(Right Frame)R(Right Frame). The related art technologies proposed by the present applicant may be used to solve the problem of luminance deviation in the LLRR data display manner for preventing the image trailing phenomenon.

In other words, the first crosstalk compensation unit 23 successively displays the left eye image during two frames and then successively displays the right eye image during two frames, as disclosed in 10-2010-0058945 corresponding to the present applicant, and which are hereby incorporated by reference in their entirety. More specifically, the first crosstalk compensation unit 23 may perform the first ODC modulation on data of the left eye image (or the right eye image) using a first modulation value in a first frame of the two frames. Then, the first crosstalk compensation unit 23 may performs the second ODC modulation on the data of the left eye image (or the right eye image) using a second modulation value equal to or less than the first modulation value in a second frame of the two frames.

The first crosstalk compensation unit 23 performs the ODC modulation on the 3D data through the above-described various technologies and outputs firstly compensated 3D data 3D DATA'.

The second crosstalk compensation unit 27 multiplies the firstly compensated 3D data 3D DATA' by a predetermined constant value, which is previously determined depending on the input frame frequency and is greater than zero and equal to or less than 1, based on the frame frequency information FDI stored in the EEPROM 25, thereby finally compensating for the crosstalk of the 3D data. The input frame frequency multiplied by the constant value of 1 is a reference frame frequency and is the highest frequency selected among the determined frame frequencies. The reference frame frequency in the embodiment of the invention is 240 Hz.

For example, as shown in FIG. 6, when the frame frequency information FDI stored in the EEPROM 25 is the binary number '00' indicating the NTSC signal of 240 Hz, the second crosstalk compensation unit 27 multiplies the firstly compensated 3D data 3D DATA' by a first constant value C1 equal to 1. When the frame frequency information FDI stored in the EEPROM 25 is the binary number '01' indicating the PAL signal of 200 Hz, the second crosstalk compensation unit 27 multiplies the firstly compensated 3D data 3D DATA' by a second constant value C2 less than the first constant value C1. When the frame frequency information FDI stored in the EEPROM 25 is the binary number '10' indicating the NTSC signal of 120 Hz, the second crosstalk compensation unit 27 multiplies the firstly compensated 3D data 3D DATA' by a third constant value C3 less than the second constant value C2. When the frame frequency information FDI stored in the EEPROM 25 is the binary number '11' indicating the PAL signal of 100 Hz, the second crosstalk compensation unit 27 multiplies the firstly compensated 3D data 3D DATA' by a fourth constant value C4 less than the third constant value C3.

As shown in FIG. 6, as the input frame frequency decreases, time required in the response of the liquid crystals in one frame increases. Therefore, as the input frame frequency gradually decreases from the reference frame frequency multiplied by the constant value of 1, the second crosstalk compensation unit 27 multiplies the firstly compensated 3D data 3D DATA' by the gradually decreasing constant value between zero and 1 to thereby obtain the finally compensated 3D data 3D DATA". As a result, the second crosstalk compensation unit 27 prevents the over shoot generated in the liquid crystal response and greatly reduces the crosstalk of the 3D data irrespective of the input frame frequency. The second crosstalk compensation unit 27 outputs the finally compensated 3D data 3D DATA" to the control circuit 11.

Figure 7:
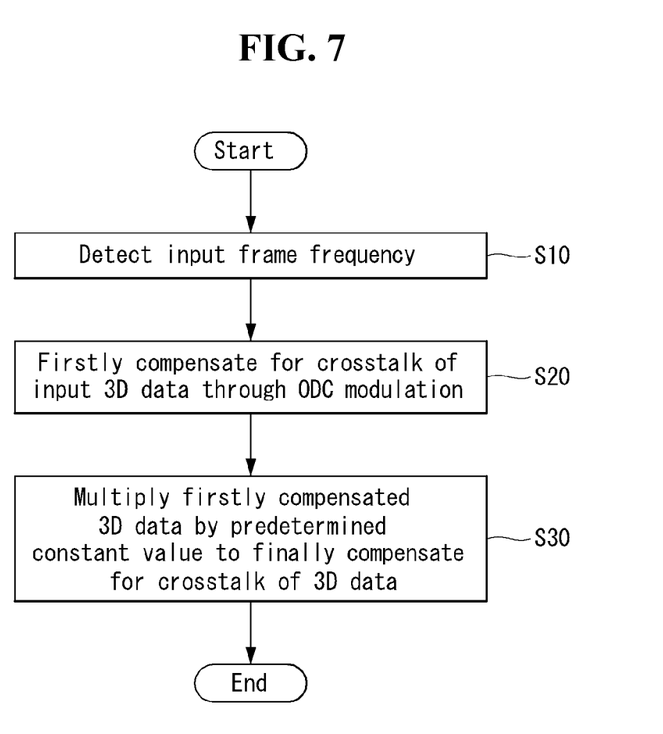
FIG. 7 is a flow chart sequentially illustrating a method for compensating for a crosstalk of a stereoscopic image display according to an exemplary embodiment of the invention.

FIG. 7 is a flow chart sequentially illustrating a method for compensating for the crosstalk of the stereoscopic image display according to the embodiment of the invention.

As shown in FIG. 7, the crosstalk compensation method detects the input frame frequency based on the vertical sync signal Vsync in step S10.

Next, the crosstalk compensation method firstly compensates for the crosstalk of the input 3D data through the ODC modulation in step S20. The Patent Disclosures corresponding to the present applicant and which are hereby incorporated by reference in their entirety may be applied to the first compensation, so as to solve the problem of luminance deviation in the LBRB data display manner.

Next, the crosstalk compensation method multiplies the firstly compensated 3D data by the predetermined constant value, which is previously determined depending on the detected input frame frequency and is greater than zero and equal to or less than 1, to finally compensate for the crosstalk of the 3D data in step S30.

The stereoscopic image display and the crosstalk compensation method thereof according to the embodiment of the invention detect the input frame frequency, perform the ODC modulation on the 3D data to firstly compensate for the crosstalk of the 3D data, and multiply the firstly compensated 3D data by the predetermined constant value, which is previously determined depending on the detected input frame frequency and is greater than zero and equal to or less than 1, to finally compensate for the crosstalk of the 3D data. As a result, the stereoscopic image display and the crosstalk compensation method thereof according to the embodiment of the invention prevent the over shoot generated in the response of the liquid crystals irrespective of the input frame frequency and can greatly reduce the crosstalk of the 3D data.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
    a crosstalk compensation circuit configured to detect an input frame frequency, perform over driving control (ODC) modulation on 3D data to firstly compensate for a crosstalk of the 3D data, and additionally modulate the firstly compensated 3D data based on the detected input frame frequency to finally compensate for the crosstalk of the 3D data; and
    a display element configured to display left eye image data and right eye image data included in the finally compensated 3D data in a time division manner,
    wherein the crosstalk compensation circuit includes a multiplier configured to multiply the firstly compensated 3D data by a predetermined constant value, which is previously determined depending on the detected input frame frequency and is greater than zero and equal to or less than 1, to finally compensate for the crosstalk of the 3D data,
    wherein the crosstalk compensation circuit further includes:
        an input frequency detecting unit configured to detect the input frame frequency based on a vertical sync signal;
        a first crosstalk compensation unit configured to perform the over driving control (ODC) modulation on the 3D data input via the input frequency detecting unit to firstly compensate for the crosstalk of the 3D data; and
        a second crosstalk compensation unit configured to include the multiplier to finally compensate for the crosstalk of the 3D data,
    wherein as the input frame frequency decreases from a reference frame frequency obtained by multiplying the input frame frequency by the constant value of 1, the multiplier multiplies the firstly compensated 3D data by the decreasing constant value between zero and 1,
    wherein the reference frame frequency is the highest frequency selected among previously determined frame frequencies, and
    wherein an electrically erasable programmable read-only memory (EEPROM) is connected in series between the input frequency detecting unit and the second crosstalk compensation unit and in parallel to the first crosstalk compensation unit, and is configured to: receive the frame frequency information from the input frequency detecting unit, nonvolatily store the frame frequency information, and provide the stored frame frequency information to the second crosstalk compensation unit.

2. The stereoscopic image display of claim 1, wherein the input frequency detecting unit includes:
    a national television standards committee (NTSC)/phase alternate line (PAL) deciding unit configured to divide the vertical sync signal by 60 Hz, output a first decision signal based on the decision of NTSC format when a remainder after the division is zero, and output a second decision signal based on the decision of PAL format when the remainder after the division is not zero;
    an NTSC signal detecting unit configured to detect whether the vertical sync signal is 120 Hz or 240 Hz in response to the first decision signal; and
    a PAL signal detecting unit configured to detect whether the vertical sync signal is 100 Hz or 200 Hz in response to the second decision signal.

3. The stereoscopic image display of claim 2, wherein when the vertical sync signal is 240 Hz, the NTSC signal detecting unit stores a binary number '00' indicating an NTSC signal of 240 Hz in the EEPROM as the frame frequency information,
    wherein when the vertical sync signal is 120 Hz, the NTSC signal detecting unit stores a binary number '10' indicating the NTSC signal of 120 Hz in the EEPROM as the frame frequency information.

4. The stereoscopic image display of claim 3, wherein when the vertical sync signal is 200 Hz, the PAL signal detecting unit stores a binary number '01' indicating a PAL signal of 200 Hz in the EEPROM as the frame frequency information,
    wherein when the vertical sync signal is 100 Hz, the PAL signal detecting unit stores a binary number '11' indicating the PAL signal of 100 Hz in the EEPROM as the frame frequency information.

5. The stereoscopic image display of claim 4, wherein when the frame frequency information stored in the EEPROM is the binary number '00', the second crosstalk compensation unit multiplies the firstly compensated 3D data by a first constant value equal to 1, wherein when the frame frequency information stored in the EEPROM is the binary number '01', the second crosstalk compensation unit multiplies the firstly compensated 3D data by a second constant value less than the first constant value, wherein when the frame frequency information stored in the EEPROM is the binary number '10', the second crosstalk compensation unit multiplies the firstly compensated 3D data by a third constant value less than the second constant value, wherein when the frame frequency information stored in the EEPROM is the binary number '11', the second crosstalk compensation unit multiplies the firstly compensated 3D data by a fourth constant value less than the third constant value.

6. The stereoscopic image display of claim 1, further comprising liquid crystal shutter glasses configured to alternately open and close a left eye shutter and a right eye shutter of the liquid crystal shutter glasses in synchronization with the display element.

7. The stereoscopic image display of claim 1, further comprising:
   an active retarder attached on the display panel, the active retarder converting polarization characteristic of the left eye image and polarization characteristic of the right eye image differently from each other; and
   polarized glasses including a left eyeglass transmitting only first polarized light and a right eyeglass transmitting only second polarized light having an optical axis perpendicular to an optical axis of the first polarized light.

* * * * *